(12) United States Patent
Holmes

(10) Patent No.: US 6,539,138 B2
(45) Date of Patent: Mar. 25, 2003

(54) SYSTEM AND METHOD FOR SWITCHING OPTICAL SIGNALS THROUGH FREE SPACE

(75) Inventor: Richard B. Holmes, Cameron Park, CA (US)

(73) Assignee: General Nutronics, Inc., Cameron Park, CA (US)

(*) Notice: Subject to any disclaimer, the term of this patent is extended or adjusted under 35 U.S.C. 154(b) by 179 days.

(21) Appl. No.: 09/780,098

(22) Filed: Feb. 9, 2001

(65) Prior Publication Data

US 2003/0039432 A1 Feb. 27, 2003

Related U.S. Application Data

(63) Continuation-in-part of application No. 09/716,196, filed on Nov. 17, 2000, now Pat. No. 6,313,936.

(51) Int. Cl.⁷ .............................. G02B 6/26; H04J 14/02
(52) U.S. Cl. .............................. 385/16; 385/17; 385/18; 385/24; 359/127; 359/128; 359/124; 359/125; 359/131; 359/137; 359/138; 359/250; 359/139
(58) Field of Search .............................. 385/15, 16, 17, 385/18, 88, 89, 24; 359/127, 128, 124, 125, 131, 139, 147, 138, 250, 246

(56) References Cited

U.S. PATENT DOCUMENTS

| | | | | |
|---|---|---|---|---|
| 5,648,859 A | * | 7/1997 | Hirabayashi et al. | 349/9 |
| 5,771,320 A | * | 6/1998 | Stone | 385/16 |
| 5,959,752 A | * | 9/1999 | Ota | 359/152 |
| 6,005,694 A | * | 12/1999 | Liu | 359/110 |
| 6,313,936 B1 | * | 11/2001 | Holmes | 359/250 |
| 6,335,782 B1 | * | 1/2002 | Holmes | 359/139 |
| 6,344,912 B1 | * | 2/2002 | Hajjar et al. | 359/128 |
| 6,366,723 B1 | * | 4/2002 | Medved et al. | 385/39 |
| 6,453,083 B1 | * | 9/2002 | Husain et al. | 385/17 |

* cited by examiner

Primary Examiner—Brian Healy
(74) Attorney, Agent, or Firm—Rolando J. Tong; Ian F. Burns & Associates

(57) ABSTRACT

A method and system is disclosed for switching signals between at least one optical fiber and a plurality of nodes through free space. The invention includes a switch that comprises at least one switch element. The switch element can detect signals transmitted by the optical fiber, at least one node, or both. The switch element can also transmit signals to the optical fiber, at least one node, or both. A mirror is provided for reflecting signals to and from the nodes through free space. An imaging telescope may also be provided for imaging light on to the mirror from the switch element.

47 Claims, 4 Drawing Sheets

SYSTEM AND METHOD FOR SWITCHING OPTICAL SIGNALS THROUGH FREE SPACE

CROSS REFERENCES TO RELATED APPLICATIONS

This application is a continuation-in-part of U.S. patent application Ser. No. 09/716,196, filed on Nov. 17, 2000, now U.S. Pat. No. 6,313,936.

BACKGROUND OF THE INVENTION

1. Field of Invention

The present invention relates to a system for switching optical signals through free space. More particularly, the present invention relates to a system for switching optical signals between an optical transmission device, such as an optical fiber, and an end user or node that is separated from the optical transmission device by a distance of free space.

2. Description of Related Art

Optical communication systems are a substantial and rapidly growing part of communication networks. The expression "optical communication system," as used herein, relates to any system that uses optical signals to convey information across an optical transmission device, such as an optical fiber. Such optical systems may include, but are not limited to telecommunication systems, cable television systems, and local area networks (LANs).

While the need to carry greater amounts of data on optical communication systems has increased, the capacity of existing transmission devices is limited. Although capacity may be expanded, e.g., by laying more fiber optic cables, the cost of such expansion is prohibitive. Consequently, there exists a need for a cost-effective way to increase the capacity of existing optical transmission devices.

Wavelength division multiplexing (WDM) has been adopted as a means to increase the capacity of existing optical communication systems. In a WDM system, plural optical signals are carried over a single transmission device, each channel being assigned a particular wavelength.

An essential part of optical communication systems is the ability to switch or route signals from one transmission device to another. Designers have considered using bubbles that are capable of changing their internal reflection for switching optical signals. However, this technique is unable to switch multiple wavelengths individually. Micro-electromechanical mirrors are capable of switching optical signals. However, these mirrors have not been successfully adapted for use in a WDM system. Furthermore, both of these devices have limited switching speeds, in the range of 10 kHz for the mirror devices and in the range of 100 Hz for the bubble devices.

Other switching approaches, such as the approach disclosed in U.S. Pat. No. 4,769,820, issued to Holmes, can switch data at GHz rates, which is effectively switching at GHz transition rates. However, this approach requires substantial optical switching power, has potential cross talk, and cannot resolve wavelength over-utilization issues. What is needed is a means for switching wavelength division multiplexed signals that is capable of doing so at high speeds with no cross talk and requires low switching power.

Another problem faced by current optical communication systems is transmission of signals between end users and optical fibers. Optical fibers have not been laid to most buildings and most buildings do not have optical fiber installed in them. It would be very expensive to lay optical fiber to every building that should be connected to an optical communication network and it would be more expensive still to retrofit existing buildings with optical fiber so that users in the building can be directly connected to the network.

To overcome this problem, edge switches have been developed for use with optical systems. Edge switches are switches that transmit signals between one or more transmission devices and one or more end users. Existing edge switch products include Cisco Edge Services Router 10000, HP ProCurve 2524, SMC Barricade 11 Mbps Wireless Broadband Router, and Linksys Broadband Etherfast Cable/DSL Router. These systems have as many as 24 ports for high-speed inputs that distribute signals to as many as 250 users. However, none of these systems are purely optical, e.g., they do not transmit optical signals to the end users.

Some of these devices utilize wireless technology to transmit signals between the optical system and the end user. However, wireless connections have limited total capacity, about 4 Gbits/sec at most. Optical free-space interconnects are being developed by Nortel and Terabeam for building-to-building interconnections.

U.S. patent applications titled Method and Device for Switching Wavelength Division Multiplexed Optical Signals Using Emitter Arrays, filed on Sep. 20, 2000, incorporated herein by reference, discloses a high-speed optical switch. This switch may comprise a plurality of switch elements, each switch element being capable of detecting and emitting a range of wavelengths. The invention is capable of switching signals in any number of wavelengths between any number of fibers that may be in different spatial positions. As will be discussed below, this switch may be used to switch optical signals between an optical transmission device and other devices or end users that are separated from the optical transmission device by a distance of free space.

SUMMARY OF INVENTION

Advantages of the Invention

An advantage of the present invention is that it allows end users to communicate over an optical communication system with a free space connection.

Another advantage of the present invention is that it allows end users to communicate over an optical communication network without having contiguous optical fiber laid to the end users.

Another advantage of the present invention is that end users may communicate with an optical communication system without installing optical fibers in buildings or other structures where the end users are located.

Another advantage of the present invention is that it provides an edge switch that is capable of communicating with a very large number of end users or nodes.

A further advantage of the present invention is that it provides an optical edge switch that may communicate with an end user or node in a wavelength that is different than the wavelength used by the communication system.

Yet another advantage of the present invention is that it provides a high-speed edge switch that is capable of utilizing wave division multiplexing.

These and other advantages of the present invention may be realized by reference to the remaining portions of the specification, claims, and abstract.

Brief Description of the Invention

The present invention comprises an optical switch for switching optical signals between a plurality of nodes and at least one optical fiber. The optical switch comprises at least one switch element and a mirror.

The switch element comprises at least one detector array, at least one emitter array, and at least one controller. The detector array is positioned to receive optical signals transmitted by the optical fiber and the nodes, rhe emitter is positioned to transmit optical signals to the plurality of nodes and the optical fiber, and the controller is in communication with the detector array and the emitter array. The controller is adapted to cause the emitter array to transmit the optical signal transmitted by the optical fiber.

The mirror is being positioned to reflect optical signals between the switch element and the plurality of nodes. The mirror is adapted to reflect optical signals between the switch element and the plurality of nodes, wherein the optical signal transmitted by the emitter array of the switch element is reflected to at least one of the plurality of nodes and an optical signal transmitted by at least one of the plurality of nodes is transmitted to the detector of the switch element.

The above description sets forth, rather broadly, the more important features of the present invention so that the detailed description of the preferred embodiment that follows may be better understood and contributions of the present invention to the art may be better appreciated. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF THE PREFERRED EMBODIMENT

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made with out departing from the scope of the present invention.

System

Figure 1:
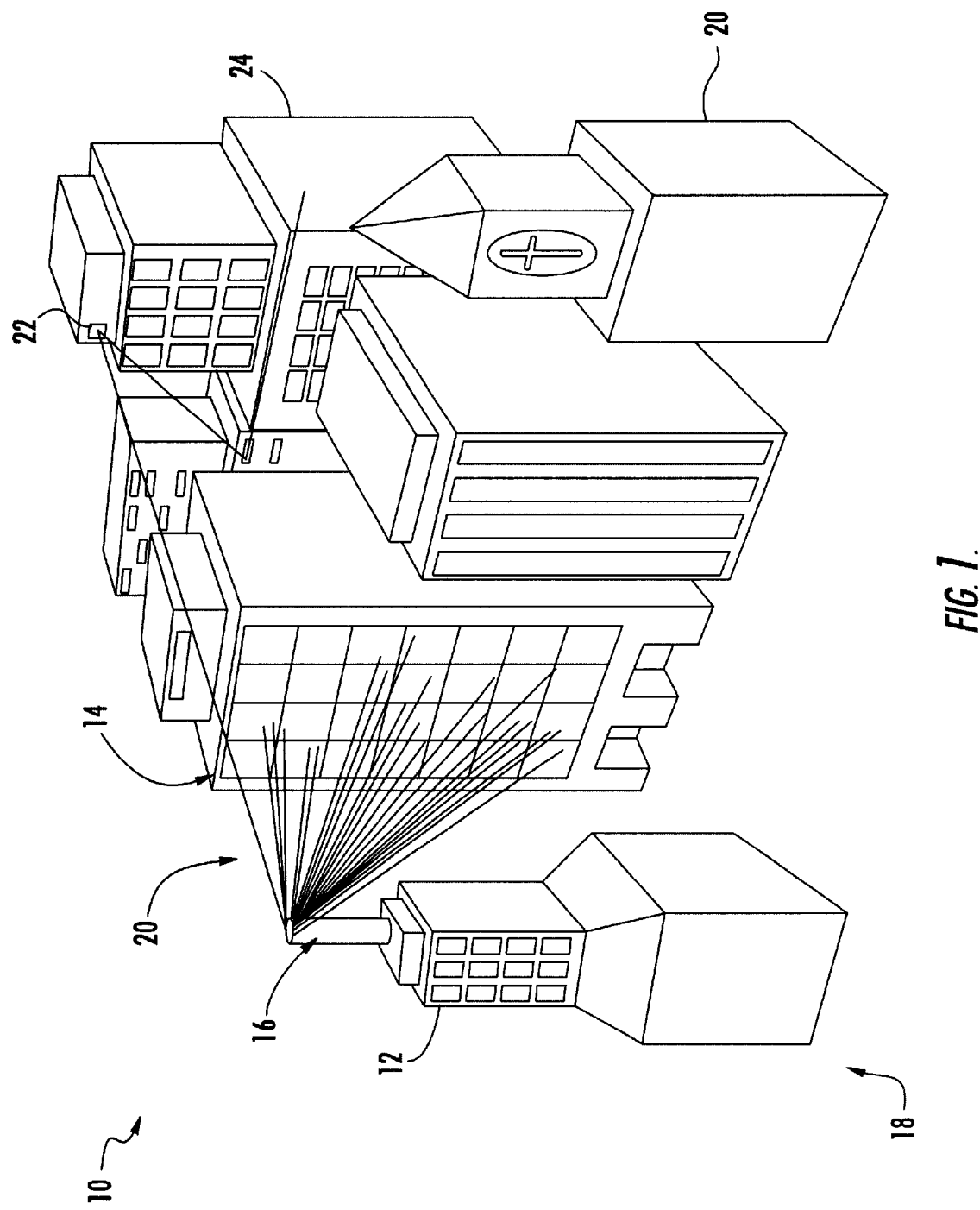
FIG. 1 is substantially a schematic diagram of the system of the present invention.

As seen in FIG. 1, the present invention comprises a system for transmitting optical signals, generally indicated by reference number 10. System 10 comprises at least one optical fiber 12, node 14, and optical switch 16. Optical fiber 12 may be any device that is adapted to transmit optical signals. In the preferred embodiment, optical fiber 12 is adapted to transmit data at high speeds. In accordance with current industry practices optical fiber 12 may transmit light in 1300 to 1550 nm range at 10 or 40 gigahertz. Optical fiber 12 may be connected to a communication network 18 that may include a central office 20.

Nodes 14 are points in system 10 where devices that use information can send and receive optical signals. For example, nodes 14 may comprise a computer that communicates with other devices over communication network 18. Nodes 14 may be, but are not required to be, in a location where it is difficult to connect to network 18.

System 10 operates by transmitting optical signals between switch 16 and nodes 14. The optical signals are transmitted along paths 20, which are dependent on the location of switch 16 and each individual node 14. Nodes 14 may be in many different locations, structures, and distances. In addition, switch 16 and node 14 need not be in line of sight with each other. One or more mirrors, amplifiers, repeaters, or other devices 22 may be provided for reflecting signals between a hidden node 26 and switch 16. In one embodiment, device 22 may be similar to switch 16 that is adapted to receive and retrainsmit signals to a node 26 or another switch device. Switch 16 may be on the top or side of a building, as shown, on a telephone pole, on a transmission tower, or in many other locations.

Switch 20 is adapted to receive signals from fiber 12 and route them to an appropriate node 14. It may also be adapted to receive a signal from one or more of nodes 14 and transmit it to fiber 12.

Switch

Figure 2:
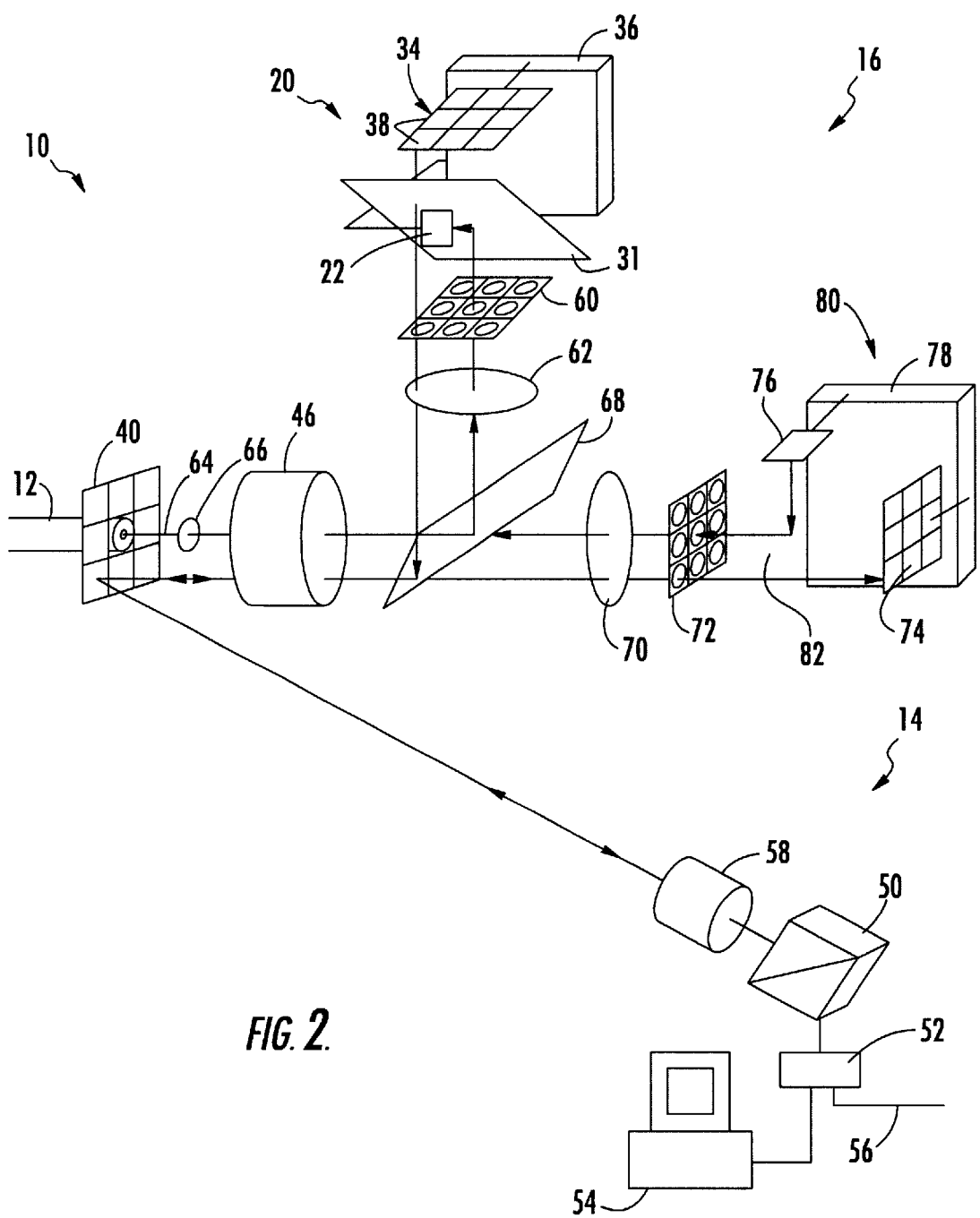
FIG. 2 is substantially a more detailed schematic diagram of the system of the present invention.

Turning now to FIG. 2, light 64 is transmitted into switch 16 by way of fiber 12. Light 64 first passes through a lens 66. If more than one fiber 12 is used, a lenslet array may be provided with a lens for each fiber. After the light passes through lens 66, it passes through telescope 46 and is reflected by beam splitter 68. Beam splitter 68 is adapted to reflect light in a first and second range of wavelengths and to transmit light in a third and fourth range of wavelengths. In one embodiment, for example, beam splitter 68 reflects light at approximately 1550 and 850 nm and transmits light at approximately 855 and 1300 nm. 1550 nm is the wavelength of light transmitted by fiber 12. Beam splitter 68 may be similar to custom beam splitters produced by OCLI-JDS Uniphase or Barr Associates.

Once the light is reflected by beam splitter 68, the reflected light passes through a lens 62 and a lenslet array 60. The combined effect of lens 66, telescope 46, lens 62, and lenslet array 60 is to focus light 64 on a detector 32 of first:switch element 30.

First switch element 30 may be similar to the switch elements disclosed in U.S. patent application entitled Method and Device for Switching Wavelength Division Multiplexed Optical Signals, filed on Sep. 20, 2000, incorporated herein by reference. First switch element 30 comprises a detector 32, an emitter array 34, and a switch controller 36. Detector 32 is in communication with controller 36 and it is adapted to detect signals transmitted by fiber 12. A single detector is shown in FIG. 2 to receive the signal transmitted by fiber 12. However, a plurality of detectors or a detector array may be provided to receive signals from a plurality of fibers.

It is also recognized that fiber 12 may be connected directly to detector 32 so that light 64 can bypass lens 66, telescope 46, beam splitter 68, lens 62, lenslet array 60, and beam splitter 31. This configuration has less attenuation, which improves the detection capability of switch 16. Outgoing signals will also be stronger because beam splitter 31 in first switch element 30 is not needed. Outgoing signals may be introduced into fiber 12 by a separate fiber that is spliced into fiber 12.

Emitter array 34 is also in communication with controller 36 and it is adapted to transmit signals to nodes 14 in the second range of wavelengths (850 nm). A beam splitter 31 may be provided for reflecting at least a portion of incoming light to detector 32, which is positioned so that its receiving surface is 90 degrees from the emitting surface of the emitter array 34. However, it is recognized that detector 32 and emitter array 34 may be positioned on the same side of switch element 30, in which case beam splitter 31 is not necessary.

In normal operation, detector 32 converts the optical signals to electrical signals and transmits them to controller 36. Controller 36 is adapted to determine the route or destination of the signal. Controller 36 may use different methods for determining the destination of the signal. This may include reading a portion of the signal that specifies the destination or route of the signal. Other methods known in the art or disclosed in the above referenced patent application may also be used to determine the destination.

Once controller 36 has determined the destination of the signal, it selects one or more target nodes 14 to which to transmit the signal. The selected node 14 may be selected because it is the destination of the signal or because this node can transmit the signal towards its intended destination. Once the node or nodes are selected, controller 36 selects one or more emitters in emitter array 34 to transmit the signal.

In the preferred embodiment, emitter array 34 comprises an array of emitters 38 that comprise Vertical Cavity Surface Emitting Lasers (VCSELs) similar to VCSELs produced by Honeywell in Richardson, Tex. In another embodiment, the emitters may be light-emitting diodes (LEDs) or edge-emitting lasers (EELs). Emitter array 34 may be in any shape, such as a square (as shown), a rectangle (not shown), or a circle (not shown) and any number of emitters 38 may be used. The power level of emitters 38 in the near infrared region is no more than 1 milliwatt in order to maintain eye-safe operation. The position of each emitter 38 in emitter array 34 corresponds to a particular node 14. The emitter or emitters are selected based on the position of the selected node 14. Once the emitter is selected, controller 36 causes the selected emitter or emitters 38 to transmit the signal. Emitter array 34 transmits the signal in the second range of wavelengths through lenslet array 60 and lens 62 to beam splitter 68. Since beam splitter 68 reflects light in the second range of wavelengths (850 nm), the light is reflected through telescope 46 to one or more of a plurality of mirrors 40.

FIG. 2 discloses only a single switch element for receiving light from fiber 12 and transmitting light to nodes 14. However, it is recognized that any number of switch elements may be provided in an array in a manner disclosed in the above referenced patent application. Each switch element may be adapted to detect and emit a range of wavelengths. Thus, the present invention may be adapted to switch wavelength division multiplexed signals.

Telescope 46 images the light at the lenslet array 60 onto mirrors 40. The depth of image is sufficient so that the mirrors may be of uniform size. Telescope 46 may be similar to a number of devices that are known in the art, such as a Dall-Kirkham telescope with a magnification of approximately 40 manufactured by Lambda 10 in New Jersey. A Cassegrain beam-expanding telescope may also be used in order to take advantage of more readily available or more economical configurations. A Scheifspeigler off-axis telescope may also be used to improve utilization of the central portion of the emitter array.

Mirrors 40 are positioned to reflect light to nodes 14. Mirrors 42 are preferably statically positioned for applications where nodes 14 are statically positioned. However, mirrors 42 may also be dynamically positioned to allow the mirrors to transmit signals to dynamically positioned nodes or allow one mirror to reflect light to two or more nodes. Mirrors 42 may also be dynamically positioned to make small adjustments to the position of the mirrors. This may be desirable to compensate for errors induced by environmental conditions. The positioning of mirrors 40 may be performed by various means that are known in the art. For example, positioning may be performed by electrical motors or mirrors 40 may be micro-electromechanical mirrors of the type that are produced by Lucent Technologies of Murray Hill, N.J. Mirrors 40 may be arranged in many different configurations. For example, mirrors 40 may be arranged in a two-dimensional array, as shown in FIG. 2, or a three dimensional shape, such as the cone disclosed in FIG. 3 or a hemisphere (not shown). If a three dimensional shape is used, the surface of the shape may have a plurality of facets or a continuous curved surface. A two-dimensional array may be best suited for use when all of nodes 14 are on the same side of switch 16. A hemisphere may be best suited for use when many users are located at significant declinations.

Node

Node 14 is provided with a telescope 58 that focuses light on an optical transceiver 50. Transceiver 50 comprises at least a detector that may be adapted to convert optical signals to electrical signals and transmit them to other devices. For example, transceiver 50 may transmit the signals to a router 52 that routs the signal to a computer 54 or network 56. Transceiver 50 may also be adapted to transmit signals in other forms, such as radio frequency, or it may amplify and retransmit the optical signals to other devices.

Transceiver 50 may also comprise an emitter that is adapted to transmit signals back to switch 16. The emitter is preferably adapted to transmit the signals in the third range of wavelengths (855 nm). Transmitted light passes through telescope 58, is reflected by mirror 40, and passes through telescope 46 to beam splitter 68. Since the light is in the third range of wavelengths, the light is transmitted by beam splitter 68 to lens 70. The light passes through lens 70, a lenslet array 72, to a second switch element 80.

Second Switch Element

Second switch element 80 comprises a detector array 74, one or more emitters 76, and a controller 78. A beam splitter 82 may also be provided if detector array 74 and emitter 76 are separated. Similar to first switch element 30, detector array 74 is in communication with controller 78 and it is adapted to convert optical signals to electrical signals. Controller 78, in communication with emitter 76, causes the emitter to transmit the signal in the fourth range of wavelengths. If a plurality of fibers are used, second switch element 80 may be provided with an emitter array. The emitted light passes through lenslet array 72, lens 70, beam splitter 68 (because it is in a transmitted range of wavelengths), telescope 46, and lens 66. The light then enters fiber 12, which transmits the light to network 18. The combined effect of lenslet array 72, lens 70, telescope 46, and lens 66 is to focus the light on fiber 12.

As discussed above, alternative embodiments may utilize more than two switching elements in order to further refine control of wavelength bands, or to allow greater overall switching throughput.

Preferred Configuration

Figure 3:
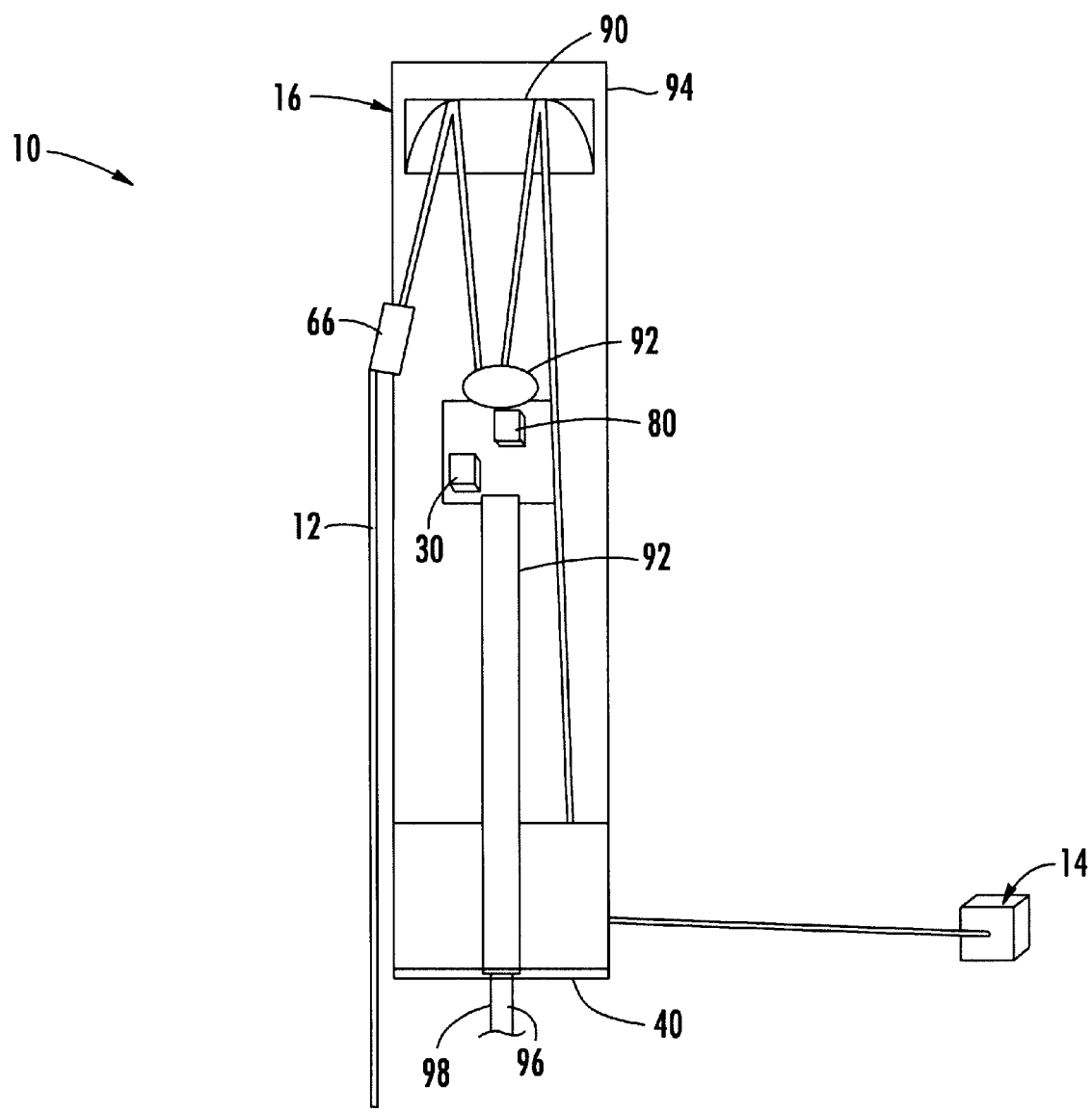
FIG. 3 is substantially a side schematic diagram of the preferred configuration of the system of the present invention.

Turning now to FIG. 3, switch 16 may comprise a container 94 that has a substantially cylindrical shape. The walls of container 94 are preferably a material that is transparent to the wavelength or wavelengths of light used to transmit between switch 16 and nodes 14. Fiber 12 may be introduced into container 94 through tube 92. However, in the preferred embodiment, fiber 12 is attached to the side of container 94. Although this arrangement may introduce greater aberrations, it allows fibers 12 to be more easily accessed for maintenance. Tube 92 may be used to introduce a power supply 98 and an interface cable 96, which may be used to communicate and program controller 36 and 78.

Light from fiber 12 passes through lenslet array 66 and is reflected from a primary mirror 90 that is positioned near the top of container 94. Primary mirror reflects the light to a secondary lens 92. The light is then introduced into switch element 30 as discussed above. Outgoing light from switch element 30 passes through secondary lens 92 and is reflected off of primary mirror 90. Primary mirror 90 reflects the light downward to cone-shaped mirror 40, which reflects the light out to node 14. Angular spacing of the facets on the cone-shaped mirror 40 helps to prevent passage of stray light through the system, and significantly reduces cross talk. Light returning from node 14 is transmitted along the same path as the outgoing light and light transmitted by switch element 80 is transmitted along the same path as the incoming light.

Specifications

The following is a table of specification that may be used in the present invention:

| Parameter | Value | Units | Comments |
| --- | --- | --- | --- |
| Telescope | 20 | NA | Images lenslet array at emitters to larger size |
| Emitter array | 250 | Microns | Convenient and common pitch |
| Emitter array count | 32 × 32 | NA | Conveniently large, could be more or less, may be clipped to a circular shape |
| Lenslet array | 250 | Microns | Matches emitter array pitch |
| Size of image of lenslets | 0.5 | Cm | At cone, large enough to avoid excess divergence for propagation to end-user |
| Width (diameter) of cone | 16 | Cm | Any larger would drive cost of primary mirror, smaller would increase divergence of beamlets for full 32 × 32 arrays |
| Size of mirrors | 0.5 | Cm | Matches size of lenslets |
| Cone mirror adjustability | Tip tilt | NA | Optional |
| Secondary | 8 | Mm | Clear aperture |
| Primary-secondary | 23 | Cm | Needed based on magnification and size of emitter array |
| Secondary-lenslet spacing | 3 | Cm | Leads to marginally comfortable f-number of 3 |
| Primary-cone spacing | 60 | Cm | Required for imaging based on other parameters |
| Depth of image at cone | 125 | Cm | Criterion = 20% change in lenslet image |
| Depth of image Asd; fat lenslets | 0.3 | Cm | Criterion = 20% change in image size |
| Lenslet size at fiber | 0.45 | Cm | Underfills image footprint |
| Distance from fibers to fiber | 3 | Cm | Assumes light comes out of emitters with an Numerical Aperture of 0.15, and lenslet |
| Distance from emitters to emitter lenslets | 2.5 | Mm | Assumes light comes out of emitters with an NA of 0.1, and lenslet diameter = 250 μm |
| Focal length of fiber lenslets | 3 | Cm | Assumes light comes out of emitters with an NA of 0.15, and lenslet diameter = 0.4 cm |
| Focal length of emitter lenslets | 2.5 | Mm | Assumes light comes out of emitters with an NA of 0.1, and lenslet diameter = 250 μm |

The basic paraxial equations for telecentric imaging are used to calculate values in Table 1, and are as follows:

$$\text{Secondary-Primary mirror (or lens) separation } S = f_1 + f_2 \quad (1)$$

$$\text{Magnification from input (lenslets) to output } M = f_2/f_1 \quad (2)$$

Where $f_1$ and $f_2$ are the focal lengths of the secondary and primary, respectively. If $r_1$ is the distance from the input (object, emitter lenslet) plane, and $r_2$ is the distance from the primary to the output (image, cone mirror) plane, then $r_1$ and $r_2$ are related by $$r_2 = M f_1 + M^2 (f_1 - r_1) \quad (3)$$

and the depth of imaging for an allowable blur of size δx for a given input angular uncertainty δθ is $$\delta r_2 = \delta x \, M/\delta\theta \quad (4)$$

Method of Alignment

It is necessary to align switch 16 so that it may communicate with nodes 14. Switch 16 may be aligned using the following method for each node 14:

1. Install node 14 in an appropriate location.
2. Transmit a signal from node 14. The signal may be an AC time-modulated signal.
3. It may be necessary to cause the signal to diverge so that its beam is wide enough to fall on switch 16 with some acceptable degree of misalignment. Preferably, the divergence is large enough (2 mrad or more) to allow a technician to hand point the node to switch 12.
4. Point switch 50 towards switch 16.
5. Detect the signal on the detector array.
6. Determine which individual detector or group of detectors detects the strongest signal. This may be accomplished with software that compares the outputs of all of the detectors and determines which detector or group of detectors produce the strongest output.
7. Associate the detector or detectors located above with the particular node 14 and/or the end user. This detector or detectors is stored in memory within controllers 78.
8. Associate an emitter or emitters with node 14. Each emitter or group of emitters in array 34 is associated with a detector or detectors in array 74. This association can be determined when switch 16 is manufactured. Thus, once a detector or detectors is associated with a node, the corresponding emitter or emitters can be associated with a node.

9. Assign a unique code or address to the node. This code is stored both at node 16 and at switch 16 in both switch elements 30 and 80. This code may be applied to every signal transmitted to and from the node. The code is preferably unique so that each node can easily distinguish (via correlation processing, for example) a signal intended for it from signals intended for other nodes. Similarly, switch 16 can distinguish between signals from the node and signals from other nodes. This allows system 10 to properly route signals, even if cross talk does occur. This encoding allows for vastly simplified alignment. However, the disadvantage of this encoding is either a higher required modulation bandwidth for the light, emitters, and detectors, or a lower data transmission rate.

Of course, alignment of the small mirrors on the cone may also be performed. Such alignment would consist of tip-tilt alignment, and would preferably be done only if necessary, because of the cost associated with the manual labor. Positional alignment can also be done if necessary, preferably by moving the mirrors around support rings or between support rings of the cone structure.

Alternative Embodiments

Figure 4:
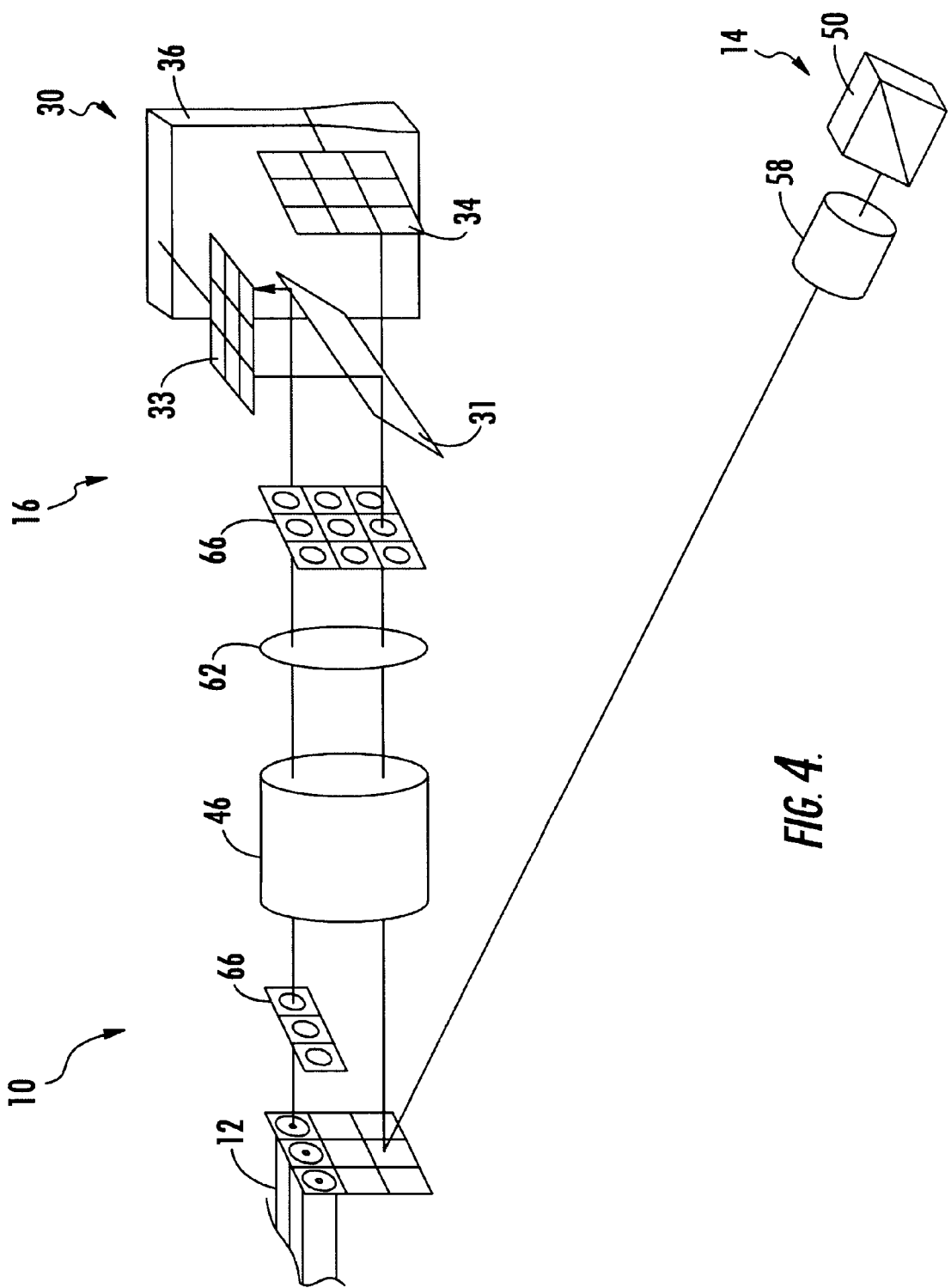
FIG. 4 is substantially a schematic diagram of an alternative embodiment of the present invention.

The present invention comprises an alternative switch embodiment disclosed in FIG. 4. In this embodiment second switch element 80 and beam splitter 68 (seen in FIG. 2) are eliminated. Instead, first switch element 30 comprises a detector array 33 rather than single detector 32 utilized in the first embodiment. Detector array 33 is positioned to receive signals from both fibers 12 and nodes 14 in spatially disjoint regions. Emitter array 34 is positioned to transmit signals to both fibers 12 and nodes 14 in spatially disjoint regions. This embodiment has the advantages of fewer parts, lower cost, and less signal loss due to absorption in beam splitter 68, but initial assembly and internal alignment is more difficult.

The embodiment in FIG. 4 is shown with a plurality of fibers 12. As discussed above, the present invention may be provided with any number of fibers and lenslet array 66 may be modified to fit the number of fibers. In yet another alternative embodiment, the fiber lenslets are eliminated and the fibers are introduced into the system by a common lens. The light from this lens circumvents the imaging telescope, and is imaged onto their respective telecom-band detectors or emitters by lenses that are located between the respective detector and/or emitter and the dichroic beam splitter within the respective switching elements. The lenslet arrays at the switching elements are also relocated to be between the respective near-IR detector or emitter arrays and the dichroic beam splitter within the respective switching elements. This embodiment can ease some alignment tolerances and may be preferred in some cases.

CONCLUSION

It may now be seen that the present invention achieves many advantages not known in the prior art. The present invention allows end users to communicate over an optical communication system through a free space connection without having contiguous optical fiber laid to the end users and without installing optical fibers in buildings or other structures where the end users are located. The present invention also provides an edge switch that is capable of communicating with a very large number of end users or nodes using wavelength division multiplexing in a variety of wavelengths.

Although the description above contains many specifications, these should not be construed as limiting the scope of the invention but as merely providing illustrations of some of presently preferred embodiments of this invention. Thus, the scope of the invention should be determined by the appended claims and their legal equivalents rather than by the examples given.

What is claimed is:

1. A system for transmitting optical signals through free space, the system comprising:
   (A) at least one optical fiber, the optical fiber being adapted to transmit optical signals;
   (B) a plurality of nodes, the nodes being adapted to transmit and receive optical signals; and
   (C) an optical switch in optical communication with the optical fiber and the plurality of nodes, the optical switch comprising:
      (a) a first switch element, the first switch element comprising:
         (i) at least one detector positioned to receive optical signals transmitted by the optical fiber;
         (ii) at least one emitter array, the emitter being positioned to transmit optical signals to the plurality of nodes;
         (iii) a controller in communication with the detector and the emitter array, the controller being adapted to cause the emitter array to transmit the optical signal transmitted by the optical fiber;
      (b) a second switch element, the second switch element comprising:
         (i) at least one detector array positioned to receive optical signals transmitted by at least one of the plurality of nodes;
         (ii) at least one emitter, the emitter being positioned to transmit optical signals to the optical fiber;
         (iii) a controller in communication with the detector and the emitter, the controller being adapted to cause the emitter to transmit the optical signal transmitted by the at least one of the plurality of nodes; and
      (c) a mirror, the mirror being positioned to reflect optical signals between the first and second switch elements and the plurality of nodes, wherein the optical signal transmitted by the emitter array of the first switch element is reflected to at least one of the plurality of nodes and an optical signal transmitted by at least on of the plurality of nodes is reflected to the detector of the second switch element.

2. The system of claim 1 wherein the mirror is substantially cone shaped.

3. The system of claim 1 wherein the mirror is substantially hemispherical.

4. The system of claim 1 wherein the mirror is substantially planar.

5. The system of claim 1 further comprising at least one beam splitter positioned to reflect optical signals to the detector of the first switch element, the beam splitter being adapted to reflect light within a predetermined range of wavelengths and allow light outside of the predetermined range of wavelengths to pass through the beam splitter, wherein the signal transmitted by the optical fiber is within the predetermined range of wavelengths.

6. The system of claim 5 wherein the emitter array of the first switch element is adapted to transmit in the range of wavelengths and the beam splitter reflects signals transmitted by the emitter array of the first switch element.

7. The system of claim 1 further comprising at least one beam splitter positioned to reflect optical signals to the detector of the first switch element, the beam splitter being adapted to reflect light within a predetermined range of wavelengths and allow light outside of the predetermined range of wavelengths to pass through the beam splitter, the second switch element being positioned to receive optical signals that pass through the beam splitter, wherein the signal transmitted by the node is within the predetermined range of wavelengths.

8. The system of claim 7 wherein the emitter array of the second switch element is adapted to transmit outside of the range of wavelengths and the beam splitter allows signals transmitted by the emitter array of the second switch element to pass through the beam splitter.

9. The system of claim 1 further comprising at least one imaging telescope, the imaging telescope being adapted to transmit light and being positioned to transmit light from the emitter array of the first switch element to the mirror.

10. The system of claim 9 further wherein in the imaging telescope is further positioned to transmit light from the mirror to the detector array of the second switch element.

11. The system of claim 1 further comprising a lenslet array positioned between the emitter array of the first switch element and the mirror, the lenslet array being adapted to collimate light transmitted by the emitter array of the first switch element.

12. The system of claim 1 further comprising at least one beam splitter, the beam splitter being adapted to reflect light in at least a first range of wavelengths, wherein the signal transmitted by the optical fiber is within the first range of wavelengths and the beam splitter is positioned to reflect light to the detector of the first switch element.

13. The system of claim 12 wherein the beam splitter is further adapted to reflect light in a second range of wavelengths, wherein the emitter array of the first switch element is adapted to transmit light in the second range of wavelengths.

14. The system of claim 12 wherein the beam splitter is adapted to transmit light in a second range of wavelengths, wherein the detector array of the second switch element is adapted to detect light in the second range of wavelengths.

15. The system of claim 12 wherein the beam splitter is adapted to transmit light in a second range of wavelengths, wherein the emitter array of the second switch element is adapted to transmit light in the second range of wavelengths.

16. A system for transmitting optical signals through free space, the system comprising:
    (A) at least one optical fiber, the optical fiber being adapted to transmit optical signals;
    (B) a plurality of nodes, the nodes being adapted to transmit and receive optical signals; and
    (C) an optical switch in optical communication with the optical fiber and the plurality of nodes, the optical switch comprising:
        (a) at least one switch element, the switch element comprising:
            (i) at least one detector array positioned to receive optical signals transmitted by the optical fiber and the nodes;
            (ii) at least one emitter array, the emitter being positioned to transmit optical signals to the plurality of nodes and the optical fiber;
            (iii) a controller in communication with the detector array and the emitter array, the controller being adapted to cause the emitter array to transmit the optical signal transmitted by the optical fiber; and
        (b) a mirror, the mirror being positioned to reflect optical signals between the switch elements and the plurality of nodes, the mirror being adapted to reflect optical signals to the plurality of nodes, wherein the optical signal transmitted by the emitter array of the switch element is reflected to at least one of the plurality of nodes and an optical signal transmitted by at least on of the plurality of nodes is transmitted to the detector of the switch element.

17. The system of claim 16 wherein the mirror is substantially cone shaped.

18. The system of claim 16 wherein the mirror is substantially hemispherical.

19. The system of claim 16 wherein the mirror is substantially planar.

20. The system of claim 16 further comprising at least one imaging telescope positioned on an optical path between the emitter array and the mirror, the imaging telescope being adapted to image light on to the mirror.

21. The system of claim 20 further wherein in the imaging telescope is further positioned to transmit light from the mirror to the detector array of the switch element.

22. The system of claim 16 wherein the node comprises at least one detector.

23. The system of claim 22 wherein the node further comprises an imaging telescope positioned on an optical path between the mirror and the detector, the telescope being adapted to image light on to the detector.

24. The system of claim 16 further comprising a lenslet array positioned between the emitter array of the switch element and the mirror, the lenslet array being adapted to collimate light transmitted by the emitter array of the switch element.

25. An optical switch for switching optical signals between a plurality of nodes and at least one optical fiber, the optical switch comprising:
    (A) at least one switch element, the switch element comprising:
        (a) at least one detector array positioned to receive optical signals transmitted by the optical fiber and the nodes;
        (b) at least one emitter array, the emitter being positioned to transmit optical signals to the plurality of nodes and the optical fiber;
        (c) a controller in communication with the detector array and the emitter array, the controller being adapted to cause the emitter array to transmit the optical signal transmitted by the optical fiber; and
    (B) a mirror, the mirror being positioned to reflect optical signals between the switch element and the plurality of nodes, the mirror being adapted to reflect optical signals between the switch element and the plurality of nodes, wherein the optical signal transmitted by the emitter array of the switch element is reflected to at least one of the plurality of nodes and an optical signal transmitted by at least one of the plurality of nodes is transmitted to the detector of the switch element.

26. The system of claim 25 wherein the mirror is substantially cone shaped.

27. The system of claim 25 wherein the mirror is substantially hemispherical.

28. The system of claim 25 wherein the mirror is substantially planar.

29. The system of claim 25 further comprising at least one imaging telescope positioned on an optical path between the emitter array and the mirror, the imaging telescope being adapted to image light on to the mirror.

30. The system of claim 29 further wherein in the imaging telescope is further positioned to transmit light from the mirror to the detector array of the switch element.

31. The system of claim 25 wherein the node comprises at least one detector.

32. The system of claim 31 wherein the node further comprises an imaging telescope positioned on an optical path between the mirror and the detector, the telescope being adapted to image light on to the detector.

33. The system of claim 25 further comprising a lenslet array positioned between the emitter array of the switch element and the mirror, the lenslet array being adapted to collimate light transmitted by the emitter array of the switch element.

34. An method of aligning an optical switch and a node that are separated by a distance of free space, the optical switch comprising a detector array, the detector array comprising a plurality of detectors adapted to defect optical signals, and the node comprising at least one emitter, the emitter being adapted to transmit a signal, the method comprising:
   (A) transmitting a signal from the emitter of the node;
   (B) causing the signal to fall on the optical switch;
   (C) detecting the signal on the detector array of the switch; and
   (D) associating at least one detector of the detector array with the node.

35. The method of claim 34 further comprising causing the signal from the switch to diverge.

36. The method of claim 34 wherein the step of associating at least one detector of the detector array with the node comprises comparing the strength of the signal received by at least one emitter with the strength of the signal received by at least one other emitter.

37. The method of claim 34 wherein the optical switch further comprises an emitter array, the emitter array comprising a plurality of emitters and being adapted to transmit optical signals, the method further comprises associating at least one emitter in the emitter array with the node.

38. The method of claim 37 wherein the step of associating at least one emitter in the emitter array with the node comprises associating at least one detector in the detector array with at least one emitter in the emitter array.

39. The method of claim 34 further comprising assigning a unique code to the node.

40. The method of claim 39 further comprising transmitting the unique code in association with at least one signal transmitted to or from the node.

41. A method of switching optical signals between a plurality of nodes and at least one optical fiber, the nodes and the fiber being separated by free space, comprising:
   (A) providing a detector;
   (B) detecting an optical signal transmitted by a network transmission device using the detector;
   (C) determining a target node to which to transmit the optical signal;
   (D) providing a plurality of emitters;
   (E) determining at least one emitter positioned to transmit signals to the target node;
   (F) causing the emitter to transmit the signal,
   (G) providing a mirror in the optical path between the target node and the associated emitter;
   (H) reflecting the signal transmitted by the emitter to the target node.

42. The method of claim 41 further comprising imaging light transmitted by the emitter onto the mirror.

43. The method of claim 42 further comprising providing an imaging telescope in an optical between the emitter and the mirror.

44. The method of claim 41 further comprising:
   (A) providing a detector in the node; and
   (B) imaging light reflected by the mirror onto the detector.

45. The method of claim 44 further comprising providing an imaging telescope in an optical path between the mirror and the detector.

46. The method of claim 41 wherein the step of determining the target node comprises reading information in the signal.

47. The method of claim 41 further comprising causing the emitter to uniquely encode the data associated with the target node.

* * * * *